Aug. 14, 1962  J. S. HILL  3,049,577
COMPOSITE MATERIAL AND THERMOCOUPLE MADE THEREFROM
Filed Aug. 28, 1959
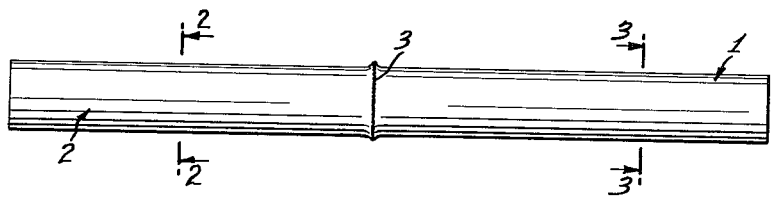
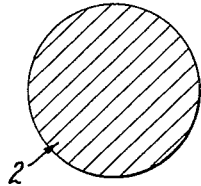
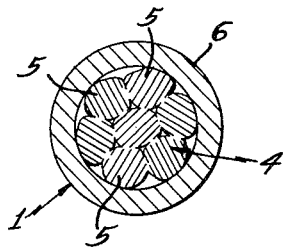
*INVENTOR.*
JAMES S. HILL
BY Karl Haber
James E. Bryan
Alan C. Rose
ATTORNEYS

United States Patent Office 3,049,577
Patented Aug. 14, 1962

---

3,049,577
COMPOSITE MATERIAL AND THERMOCOUPLE MADE THEREFROM
James S. Hill, Cranford, N.J., assignor, by mesne assignments, to Engelhard Industries, Inc., Newark, N.J., a corporation of Delaware
Filed Aug. 28, 1959, Ser. No. 836,776
11 Claims. (Cl. 136—4)

The present invention deals with a composite material and more particularly with a composite wire for high temperature application.

This application is a continuation-in-part of application Serial No. 625,405, filed November 30, 1956, now Patent No. 2,984,894.

While composite metals of various combinations either in the form of plate, strips, wires, etc., are notoriously old for a variety of applications such as for thermostatic devices, jewelry, electrical elements, bearings, machine components, etc., there are certain instances where such composite materials as known are not desirably applicable. For example, in the case of crucibles, laboratory ware, glass handling apparatus, furnace windings, thermocouples, catalysts, etc. which are employed under high temperature and corrosive conditions, conventional composite metals either impart impurities to mediums employed in connection with the use of such composite materials, or otherwise the composite materials are subject to deterioration.

In the case of conventional thermocouple wire having one thermocouple component composed of solid pure metal, because of certain desirable electrical characteristics, the wire metal is subject to grain growth and brittleness under high temperatures or in connection with corrosive conditions, and breakage or deterioration results. For example, in a wire thermocouple having a positive leg of platinum-10% rhodium and negative leg of platinum, the negative leg always breaks long before the platinum-rhodium leg because of slipping of the grains due to grain growth in the platinum.

In the use of a conventional composite material for a thermocouple element, the electrical characteristics would be deleteriously affected.

In short, none of the composite materials heretofore known are adapted to provide the desirable properties of a substantially long life and improved strength under high temperature or high temperature and corrosive conditions.

It is an object of the present invention to provide a composite material having the desirable properties of a substantially long life and improved strength under high temperature or high temperature and corrosive conditions.

It is another object of the present invention to provide a composite material having the desirable properties of a substantially pure metal and which prolongs the useful life of the pure metal under high temperature conditions.

It is a further object of the present invention to provide a composite material as a thermocouple element, the composite material being capable of desirable electrical performance as well as a substantially long useful life under high temperature or high temperature and corrosive conditions.

It is still another object of the invention to provide a composite material as a thermocouple element which has the desirable electrical properties of a substantially pure metal, whereby the electrical characteristics of the element are preserved and the useful life of the element is prolonged under high temperature conditions deleterious to pure metal thermocouple elements.

Other objects and advantages of the invention will become apparent from the description hereinafter following and drawings forming a part hereof, in which:

FIGURE 1 is an elevational view of a thermocouple according to the invention,

FIGURE 2 is a cross-sectional view along lines 2—2 of FIGURE 1, and

FIGURE 3 is a cross-sectional view along lines 3—3 of FIGURE 1.

The present invention concerns the provision of a composite material which can be employed under conditions especially where heretofore only pure metals or substantially pure metals have been advantageously used, or where certain metals and metal alloys have been used but which metals and metal alloys as such have an undesirably short life under high temperature and corrosive operating conditions. The composite material herein contemplated is particularly adapted to retain the general characteristics of a metal or metal alloy in addition to improve strength by the combination of two metal layers, which combination of layers does not substantially detract from or adversely affect the characteristics of an essential metal forming a layer of the composite material.

For example, under conditions where metal such as a platinum group metal, gold, silver, copper, nickel, etc., is desirable because of the metal characteristics, but where such metal or alloys thereof suffers from an undesirably short life due to grain growth or deterioration under deleterious conditions, the invention contemplates the provision of such a composite material which retains the general characteristics of the above mentioned metals and imparts thereto additional longevity.

The invention further deals with a thermocouple composed of platinum group metals with one thermocouple element composed of an alloy of platinum group metals e.g. platinum-rhodium, and the other thermocouple element composed of a composite platinum group metal, e.g. platinum, wherein the composite element is resistant to grain growth and has a longevity substantially equal to the alloy element. The term "composite element" refers to an element consisting of a plurality of combined components composed of the same metal.

Regarding the illustrations, the thermocouple of the invention comprises a negative leg 1 and a positive leg 2, each having one end thereof joined to the other forming a thermocouple junction 3. The positive leg 2 is a wire composed of an alloy of platinum group metals, e.g. a platinum-rhodium alloy, a platinum-iridium alloy, a platinum-ruthenium alloy, etc. The negative leg 1, as illustrated by FIGURE 3 is a composite element composed of a tubular platinum sheath, or platinum tube 6 containing a core 4 comprising a fritted bundle of platinum wires 5, the composite element being in the form of a wire. While FIGURE 3 illustrates the core wires 5 as having substantially regular cross-sections, the working of the composite wire prior to forming the thermocouple, and as hereinafter more particularly described, causes the wires to deform from their initial circular cross-section and to partly interfuse, but with micrographically discernible longitudinal boundaries between the deformed wires. The longitudinal boundaries not only inhibit grain growth throughout the composite wire cross-section, but also act as effective barriers for preventing continuous grain boundaries from developing throughout the wire diameter. Consequently, the core 4 is a barrier core formed by the plurality of wires, whereby grain growth is effectively retarded with the grain boundaries of the individual deformed wires being very irregular, and whereby the composite wire possesses substantially greater tensile strength than the conventional solid coreless wires.

The following example illustrates the method of making the composite wire of the invention:

*Example*

A bar was cast from chemically pure platinum metal sponge. The bar was worked by swaging to a one-half inch diameter and cut into two bars each six inches in length. One of the bars was swaged to 0.200 inch diameter and coiled. The coil was chemically cleaned by immersing in a bath of aqua regia, whereby about 0.003 inch of surface is removed. The wire was then drawn to 0.070 inch diameter and chemically cleaned as above. The wire was again drawn to 0.020 inch diameter and again chemically cleaned as above. At 0.020 inch diameter the wire was tested by measuring its thermal E.M.F. against a standard calibrated thermocouple wire, which developed between 0 to 10 microvolts. The wire was measured for coefficient of electrical resistance from 0° C. to 100° C. and measured in this temperature range within .0039 coefficient of resistance. The wire was spectrographically tested at 99.96 percent pure. The wire was then cut into six and one-half inch lengths. The second bar was drilled to provide a tube having one-quarter inch axial bore. The wires and tube were chemically cleaned and about one hundred wires were bundled and packed into the tube bore forming a wire bundle core. The composite core-filled tube was cold swaged to a 10 percent reduction in diameter and the ends of the wires extending from the tube were cut to tube length. The composite tube was then chemically cleaned and heat treated for sixteen hours at 1400° C. in hydrogen. The heat treated tube was then hot swaged from a 0.450 inch diameter to a 0.300 inch diameter, cold swaged to a 0.070 inch diameter, and drawn to a 0.020 inch diameter, with intermittent acid cleanings at 0.300 inch, 0.200 inch, and 0.070 inch. The wire was then again tested for thermal E.M.F., coefficient of electrical resistance and purity as above described. One end of the composite platinum wire was welded to an end of a platinum-10 percent rhodium wire to form the thermocouple.

With the thermocouple hereinbefore described, it has been found that the composite negative leg has a longevity under high temperatures corresponding to that of the alloy positive leg. In this regard, it may be noted that pure platinum has a melting point of 1769° C. while a platinum-10 percent rhodium alloy has a melting point of 1830° C. More generally, therefore, thermocouple life may be prolonged by forming the leg of lower melting point material of a composite wire as described above.

The term "platinum group metals" defines the recognized group consisting of platinum, palladium, iridium, rhodium, osmium and ruthenium as evidenced by chapter XV, Modern Uses of Nonferrous Metals, Second Edition, 1953, A.I.M.E.

While the example is specific as to dimensions, etc., the invention contemplates other suitable dimensions and other heat treating temperatures, e.g. from about 1400° C. to about 2000° C. depending on the melting point of the metal employed in the composite thermocouple element.

Various modifications of the invention are contemplated within the scope of the appended claims.

What is claimed is:

1. A thermocouple comprising a composite negative element composed of a core of a platinum group metal within a sheath composed of a platinum group metal, the core consisting of a plurality of compacted interfused elongated members in direct contact with the sheath, the sheath and core having the same metal composition, and a positive element composed of an alloy of platinum group metals bonded to the composite negative element.

2. A thermocouple comprising a composite wire negative element composed of a core of a platinum group metal within a sheath composed of a platinum group metal, the core consisting of a plurality of compacted interfused wires in direct contact with the sheath, the sheath and core having the same metal composition, and a wire positive element composed of an alloy of platinum group metals bonded to the composite negative element.

3. A thermocouple according to claim 2, wherein the core and sheath are composed of platinum.

4. A thermocouple according to claim 2, wherein the positive element is composed of a platinum-rhodium alloy.

5. A thermocouple according to claim 2, wherein the negative element is composed of platinum and positive element is composed of a platinum-rhodium alloy.

6. A thermocouple comprising a composite wire negative element composed of a core of a platinum group metal within a sheath composed of a platinum group metal, the core consisting of a plurality of interfused wires in direct contact with the sheath, the sheath and core having the same metal composition, and a wire positive element composed of an alloy of platinum group metals bonded to the composite negative element forming a thermocouple junction therebetween.

7. A thermocouple comprising a composite leg of a first metallic material having a predetermined melting point, said composite leg including a plurality of compacted interfused elongated members of said first material within a sheath also of said first material, and a second thermocouple leg having a different composition and a higher melting point that said first material, bonded to said composite leg, both of said legs formed of at least one platinum group metal.

8. A composite wire composed of a core of platinum group metal within a sheath composed of platinum group metal, the core consisting of a plurality of interfused wires in direct contact with the sheath.

9. A composite wire composed of a core of a platinum group metal within a sheath composed of a platinum group metal, the core consisting of a plurality of interfused wires in direct contact with the sheath, the sheath and core having the same metal composition.

10. A thermocouple comprising a composite leg of a first metallic material having a predetermined melting point, said composite leg including a plurality of interfused elongated members of said first material, and a second thermocouple leg having a different composition and a higher melting point than said first material and bonded to said composite leg.

11. A thermocouple according to claim 10, wherein both of said legs are formed of at least one platinum group metal.

References Cited in the file of this patent

UNITED STATES PATENTS

| | | |
|---|---|---|
| 964,961 | Fisher | July 19, 1910 |
| 2,012,465 | Godecke | Aug. 27, 1935 |
| 2,308,669 | Beed | Jan. 19, 1943 |
| 2,406,172 | Smithell | Aug. 20, 1946 |
| 2,499,977 | Scott | Mar. 7, 1950 |
| 2,703,335 | Andrus | Mar. 1, 1955 |
| 2,768,424 | Andrus | Oct. 30, 1956 |
| 2,844,637 | Borel et al. | July 22, 1958 |
| 2,853,765 | Wemhoener | Sept. 30, 1958 |
| 2,861,114 | Nishimura | Nov. 19, 1958 |

FOREIGN PATENTS

| | | |
|---|---|---|
| 597,221 | France | Aug. 25, 1925 |
| 674,068 | Great Britain | June 18, 1952 |